May 11, 1926.
M. W. REYNOLDS
POSTHOLE DIGGER
Filed Nov. 21, 1924
1,583,855
3 Sheets-Sheet 3
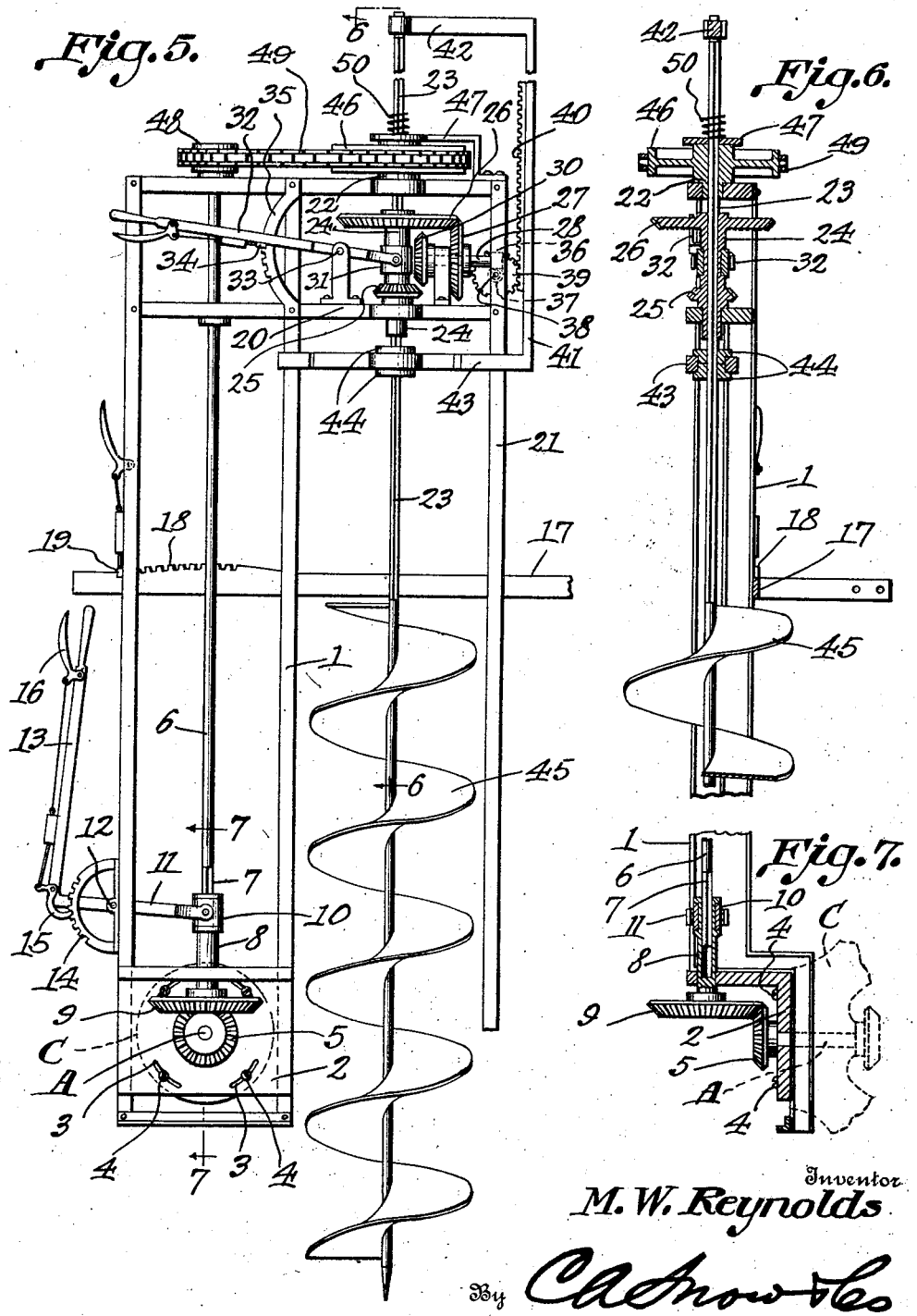
Inventor
M. W. Reynolds
By C. A. Snow & Co
Attorneys Patented May 11, 1926.

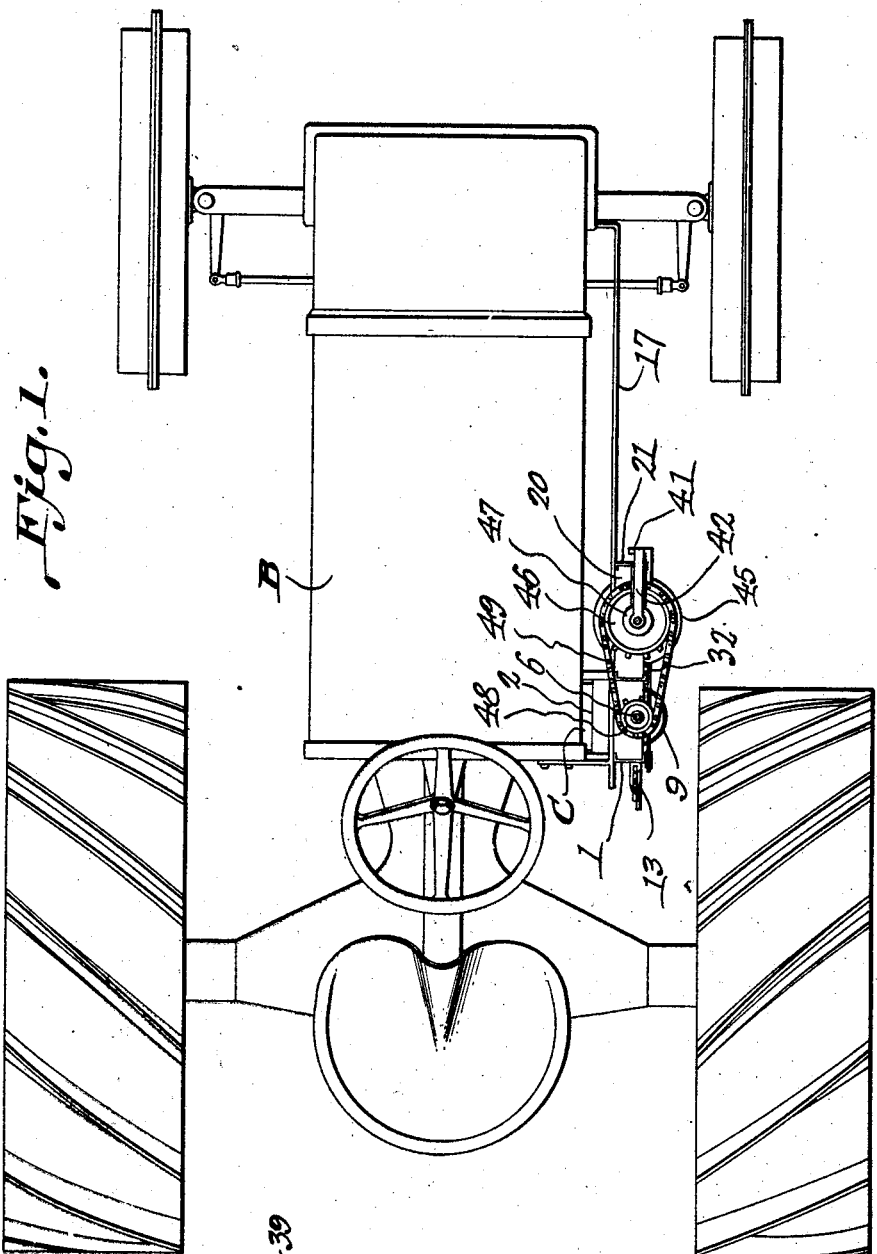

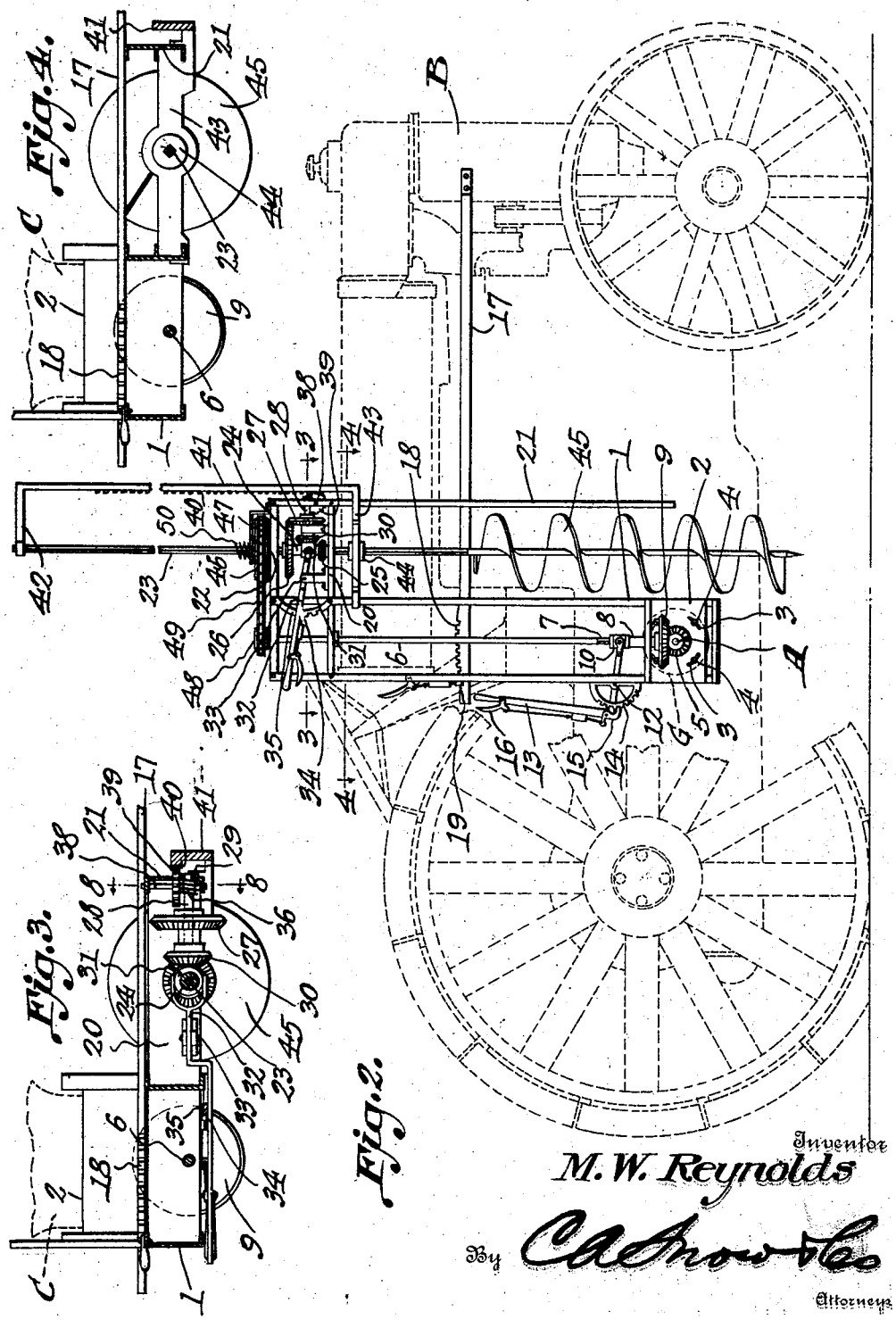

1,583,855

UNITED STATES PATENT OFFICE.

MARLYN WARD REYNOLDS, OF ALTONA, ILLINOIS.

POSTHOLE DIGGER.

Application filed November 21, 1924. Serial No. 751,311.

This invention relates to a post hole digger, one of its objects being to provide a simple, compact and efficient mechanism which can be moved from place to place and which is adapted to be coupled to a farming tractor or the like and operated to drill the hole to a desired depth and thereafter quickly to remove the drilling element from the hole.

A further object is to provide mechanism of this character by means of which post holes can be quickly formed in rapid succession, thereby materially reducing the labor and time required and consequently, the cost of making the post hole.

With the foregoing and other objects in view which will appear as the description proceeds, the invention resides in the combination and arrangement of parts and in the details of construction hereinafter described, and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a plan view of a tractor having the present improvements combined therewith.

Fig. 2 is a side elevation showing the drilling mechanism, the tractor to which it is applied being indicated by broken lines and portions of the drilling mechanism being broken away.

Fig. 3 is an enlarged section on line 3—3, Fig. 2.

Fig. 4 is an enlarged section on line 4—4, Fig. 2.

Fig. 5 is an enlarged side elevation of the drilling mechanism.

Fig. 6 is a section on line 6—6, Fig. 5.

Fig. 7 is a section on line 7—7, Fig. 5.

Fig. 8 is an enlarged section on line 8—8, Fig. 3.

Referring to the figures by characters of reference A designates the usual pulley shaft which projects from one side of the tractor B. When it is desired to use the mechanism constituting the present invention, the pulley usually found on the shaft A is removed and the lower portion of the frame 1 is mounted on the shaft so as to swing relative thereto. The lower portion of this frame is preferably provided with a plate 2 and in this plate are formed arcuate slots 3 concentric with the shaft A and adapted to receive clamping bolts 4 which enter the bearing C of the shaft A as shown by dotted lines in Fig. 7. Thus by tightening the bolts 4, the frame 1 can be supported at any desired angle relative to the surface of the ground on which the tractor B is resting. A gear 5 is subsequently secured to the shaft A so as to rotate therewith.

Journaled in the frame 1 and extending longitudinally thereof is a shaft 6, the lower end of which can be angular as shown at 7 for sliding engagement by a sleeve 8 which carries a gear 9. Obviously, if preferred, the sleeve can be feathered on the shaft. In fact the two parts can be slidably connected in any suitable way provided simultaneous rotation is insured. Sleeve 8 has a collar 10 mounted thereon within which the sleeve rotates and this collar is connected to one end of a lever 11 which is fulcrumed on the frame 1 at 12 and has a handle portion 13. A toothed segment 14 is mounted on the frame and is adapted to be engaged by a dog 15 carried by the lever. This dog can be disengaged from the segment by a hand lever 16 such as usually employed and it will be obvious that by means of this mechanism, sleeve 8 can be shifted longitudinally so as to move gear 9 into or out of mesh with gear 5.

A bar 17 is adapted to be secured to the tractor B at any suitable point and a toothed segment 18 thereon concentric with the shaft A. This segment is adapted to be engaged by a dog 19 carried by the frame so as to lock the frame 1 in any position to which it may be adjusted angularly upon the shaft A.

The upper end of the frame 1 is provided with a lateral extension 20, the free end portion of which is provided with a depending guide bar 21. In the upper portion of the extension 20 is journaled a bearing member 22 in which is slidably mounted an angular auger shaft 23. This shaft is extended downwardly through a sleeve 24 which is rotatably and slidably mounted in the lower portion of the extension 20 and carries opposed gears 25 and 26. Gear 26 is larger than the gear 25 and is adapted to mesh with a gear 27 secured to a transverse shaft 28 journaled in the end of the extension 20 and also in a bearing 29 carried by the extension. Another gear 30 is carried by shaft 28 and overhangs and is adapted to mesh with the gear 25. A collar 31 is loosely mounted on the sleeve 24 and is engaged by one end of a lever 32 which is fulcrumed in the extension 20 as indicated at 33. This lever has a dog 34 for engaging a toothed segment 35 whereby the sleeve 24 can be held in different positions. When the lever is in one extreme position the gears 25 and 30 are in mesh and when the lever is in another extreme position the gears 26 and 27 are in mesh.

The shaft 28 is provided at one end with a worm 36 which meshes with a worm gear 37 secured to the shaft 38 which is journaled in the frame extension 20. A gear 39 is secured to this shaft 38 and meshes normally with a rack 40 secured to a bar 41 which is supported parallel with the guide bar 21. The ends of the rack 40 are spaced from the ends of the bar 41 and extending laterally from the upper end of bar 41 is an arm 42 in which is journaled the upper end of the auger shaft 23. Another arm 43 is extended laterally from the lower end of bar 41 and slidably engages one side of the frame 1 and also the guide bar 21. Superposed collars 44 are secured to the shaft 23 and engage the upper and lower faces respectively of arm 43 so that the shaft, arm 43 and bar 41 must move in unison longitudinally of the frame.

An auger 45 may be formed on or secured to the shaft 23 and constitutes the boring element per se. A sprocket 46 is mounted to rotate with the shaft 23 and is supported above the extension 20. This sprocket is preferably held in proper relation to the extension 20 by a sprocket 47. Another sprocket 48 is secured to the drive shaft 6 and a chain 49 serves to transmit motion from the sprocket 48 to sprocket 46. Shaft 23, although rotatable with sprocket 46, is slidable longitudinally therein and a cushioning spring 50 is mounted on this shaft above the bracket 47 where it will be engaged by arm 42 when the auger reaches the lower limit of its movement.

It is to be understood that the mechanism herein described constitutes an attachment complete in itself which can be sold to the owner of a tractor and applied by him readily to the machine. As before pointed out, the mechanism is applied simply by removing the pulley from the shaft A, slipping the plate 2 onto the shaft, attaching the clamping bolts 4 where they will go through the slots 3, applying pulley 5 to the shaft A, and attaching bar 17 at a suitable point to the tractor.

The tractor can then be driven to the place where a post hole is to be bored and if the tractor is in an inclined position, the frame 1 can be adjusted angularly until shaft 23 is brought to a vertical position above the space where the hole is to be formed. Frame 1 is then tightened by means of bolts 4 and while gear 9 is out of mesh with gear 5, the shaft A can be set in motion. Gears 25 and 30 are placed in mesh with the bar 41 in its raised position as shown in Fig. 5. Gear 9 is then moved into mesh with gear 5 so as to cause shaft 6 to rotate. Motion will be transmitted through the chain and sprocket mechanism to shaft 23 and the auger will thus be revolved at the proper speed. At the same time gear 25 will drive gear 30 and worm 36 with the result that slow motion will be transmitted to gear 39 and rack 40. The rack will be moved slowly in a downward direction so as to feed the auger into the ground as it rotates. When the upper portion of the rack 40 reaches the gear 39, it will be forced out of mesh with the gear so that further downward feeding of the auger will cease. At this time, however, spring 48 will be placed under compression. Thus when it is desired to elevate the auger, it is merely to shift sleeve 24 so as to bring the large gear 26 into mesh with gear 27. Therefore as the gear continues to rotate, the rotation of gear 39 will be reversed. The spring 50 will act to press the rack 40 against gear 39 so that the two will promptly mesh and gear 40 be moved upward at a greatly increased speed until it reaches its uppermost position at which time it will pass out of mesh with the gear 39. As soon as the auger has been raised, the tractor can be moved to another point where the operation above described can be repeated. Obviously by providing an attachment such as described, a series of opposed holes can be quickly produced at a great saving of time and labor and with greater accuracy than will be possible ordinarily by the use of hand appliances.

What is claimed is:—

1. A posthole digging attachment for tractors and the like including a frame, a rack slidably mounted relative thereto, a gear meshing with the rack and movable out of mesh therewith at the ends of the rack, a rotatable auger movable with the rack, means for actuating the auger, means operated by the actuation of the auger for driving the rack engaging gear to shift the gear longitudinally in either direction, and yielding means for lifting the rack into mesh with its operating gear when said gear is actuated to elevate the rack.

2. The combination with a shaft of a tractor, of a digging attachment comprising a frame detachably mounted on and adjustable angularly relative to the shaft, an auger mounted for rotation relative to the frame, means for transmitting rotary motion to the auger from the shaft, a rack movable longitudinally of the frame with the auger, a gear normally meshing with the rack for shifting the rack and auger longitudinally, said rack being movable out of mesh with the auger when the auger is brought to each of its extreme positions, yieldable means compressible by the downward movement of the rack out of mesh with the gear for returning the rack into mesh with the gear when said gear is actuated to raise the rack, and means operated by the rotation of the auger and under control of the operator for driving the gear in either of two directions.

In testimony that I claim the foregoing as my own, I have hereto affixed my signature.

MARLYN WARD REYNOLDS.